United States Patent [19]

Yamamoto et al.

[11] Patent Number: 5,728,770
[45] Date of Patent: Mar. 17, 1998

[54] SURFACE TREATMENT COMPOSITION AND SURFACE-TREATED RESIN MOLDING

[75] Inventors: Tetsuya Yamamoto, Suita; Akio Naka, Takatsuki; Yukiko Hori, Shita; Daijo Tomihisa, Moriguchi; Tadahiro Yoneda, Ibaraki, all of Japan

[73] Assignee: Nippon Shokubai Co., Ltd., Osaka, Japan

[21] Appl. No.: 777,940

[22] Filed: Jan. 28, 1997

Related U.S. Application Data

[63] Continuation of Ser. No. 424,519, filed as PCT/JP93/01397, Sep. 29, 1993 published as WO95/09211, Apr. 6, 1995, abandoned.

[51] Int. Cl.$^6$ .................................................. C08K 5/06
[52] U.S. Cl. ........................... 524/755; 524/765; 524/770; 524/773; 528/26; 528/27; 528/28; 528/38; 427/387; 428/447
[58] Field of Search .................. 528/38, 26, 27, 528/28; 524/765, 770, 773, 755; 427/387; 428/447

[56] References Cited

U.S. PATENT DOCUMENTS

| | | | |
|---|---|---|---|
| 3,687,882 | 8/1972 | Bishop | 528/38 |
| 3,856,756 | 12/1974 | Wagner et al. | 528/38 |
| 3,868,342 | 2/1975 | Magne | 528/38 |
| 3,888,815 | 6/1975 | Bessmer et al. | 528/38 |
| 5,221,724 | 6/1993 | Li et al. | 528/38 |
| 5,241,000 | 8/1993 | Ohnari et al. | 528/28 |
| 5,252,703 | 10/1993 | Nakajima et al. | 528/26 |

FOREIGN PATENT DOCUMENTS

| | | |
|---|---|---|
| 0 195 493 | 9/1986 | European Pat. Off. . |
| 0 358 011 | 3/1990 | European Pat. Off. . |
| 0 392 115 | 10/1990 | European Pat. Off. . |
| 0 411 648 | 2/1991 | European Pat. Off. . |
| 0 476 202 | 3/1992 | European Pat. Off. . |
| 2 306 766 | 8/1973 | Germany . |
| 35-16031 | 10/1960 | Japan . |
| 55-133467 | 10/1980 | Japan . |
| 55-133466 | 10/1980 | Japan . |
| 58-122969 | 7/1983 | Japan . |

*Primary Examiner*—Melvyn I. Marquis
*Attorney, Agent, or Firm*—Oblon, Spivak, McClelland, Maier & Neustadt, P.C.

[57] ABSTRACT

A surface treatment composition which can form a coating having excellent gas barrier properties, transparency and flexibility, contains at least one silane compound component selected from the group consisting of a silane compound (A) having amino groups and hydrolytic condensation groups in their molecules, a hydrolytic condensation product (B) of the silane compound (A), and a co-hydrolytic condensation product (D) of the silane compound (A) and an organometallic compound (C); a compound (E) having at least two functional groups which can react with an amino group in its molecule; and solvent (F).

13 Claims, 1 Drawing Sheet

SURFACE TREATMENT COMPOSITION AND SURFACE-TREATED RESIN MOLDING

This application is a continuation of application Ser. No. 08/424,519, filed on May 26, 1995, now abandoned, which was filed as International Application No. PCT/JP93/01397, filed on Sep. 29, 1993, published as WO95/09211, Apr. 6, 1995.

FIELD OF THE INVENTION

The present invention relates to a surface treatment composition which is capable of forming coatings having excellent gas barrier properties, transparency and flexibility, and gas barrier material and heat sticking preventing coating for heat-sensitive heat transfer, both of which are surface-treated with the composition.

DESCRIPTION OF THE RELATED ART

Gas barrier materials having an extremely low level of permeability to gases such as oxygen, nitrogen, carbon dioxide, water vapor, etc. are increasingly demanded in the field of packaging materials. Known methods of giving the gas barrier properties to molded materials such as plastic films or sheets include (1) the method of forming a molded product by using a gas-impermeable material such as an ethylene-vinyl alcohol copolymer, a vinylidene chloride copolymer, a poly-m-xylylene adipamide or the like; (2) the method of laminating or coating such a gas-impermeable material on other materials; (3) the method of laminating an aluminum foil on a film material; and (4) the method of depositing a metal oxide.

However, of the gas-impermeable materials used in method (1), ethylene-vinyl alcohol copolymer and poly-m-xylylene adipamide have the problem that the gas-barrier properties significantly deteriorate with moisture absorption due to high hygroscopicity thereof. Vinylidene chloride copolymers have chlorine atoms and thus might cause environmental pollution. In method (3), an aluminum foil-laminated film makes a packaged content invisible from the outside. In method (4), a metal-deposited film has the problem that since a flexibility of the film deteriorates, cracks easily occur in the deposited layer during packaging, thereby deteriorating the gas barrier properties.

In order to solve the above problems, research has been made for treating the surface of a plastic film with polysiloxane having a tight molecular structure and excellent weather resistance, hardness and chemical resistance. However, since tetraalkoxysilane used as a material for polysiloxane exhibits as many as four hydrolytic condensation reaction points, the volumetric shrinkage rate in condensation is large, and it is thus difficult to obtain a coated film without cracks or pinholes.

Therefore, a method for preventing cracks and pinholes has been proposed in which alkyltrialkoxysilane having only three hydrolytic condensation reaction points is used singly or in combination with tetraalkoxysilane for co-hydrolytic condensation. However, in the present situation, since alkyltrialkoxysilane has low reactivity, use of alkyltrialkoxysilane alone leaves many uncondensed monomers, and combination with tetraalkoxysilane hardly permits uniform cohydrolytic condensation. Further, such silane type surface treatment compositions exhibit no affinity for plastic film materials and have poor wettability, thereby causing the problem of have poor membrane-forming properties.

Japanese Patent Laid-Open No. HEI 2-286331 discloses the method of coating alkoxysilane on a plastic film by hydrolytic condensation. However, in this method, only an alkoxysilane component is coated on the film, and thus the flexibility of the film significantly deteriorates.

From the above viewpoints, for example, Japanese Patent Laid-Open No. HEI 1-278574 discloses that alkoxysilane hydrolyzate such as tetraalkoxysilane or the like is combined with a reactive urethane resin for preventing cracks in a surface-treated coating. However, since the reactive urethane resin reacts with an alcohol used as a solvent, the alkoxysilane hydrolyzate and the reactive urethane resin are not sufficiently compounded and thus cause phase separation, thereby making the coating opaque.

On the other hand, in recent years, a heat-sensitive recording system has frequently been used for facsimile and printers in which a heat-sensitive color-developing layer comprising two components dispersed therein, which develop a color on heating, is provided on a substrate. However, this system has the faults of poor storage stability, liability to change after recording, and poor solvent resistance. A transfer-type heat-sensitive recording system is known as means for removing the above faults.

In the transfer-type heat-sensitive recording system, printing is made on a receiving sheet (e.g., plain paper) by heat pulses from a heating head through a heat-sensitive transfer material. A generally known heat-sensitive transfer material has a heat transfer ink layer such as a heat-meltable ink layer, a heat-sublimable dye-containing layer or the like, which is provided on the side contacting the receiving sheet. Since there have recently been demand for improving printing performance and printing speed, a method of decreasing the thickness of a base film and a method of increasing the quantity of heal applied to the heating head have been proposed. However, these methods cause the problem of melting the base film due to the large heat load on the base film, thereby causing a trouble in running of the heating head. This phenomenon is generally known as "heat sticking".

In order to remove this heat sticking, various proposals have been made. For example, Japanese Patent Laid-Open No. SHO 55-7467 discloses the method of coating a heat-resistant resin such as a silicone resin, an epoxy resin or the like on one side of a base film. However, in the present situation, coating of such a heat-resistant resin requires heat curing at 100° C. or more for several hours, and additionally the satisfactory effect in preventing heat sticking cannot be obtained because a silicone resin has poor adhesion to the base film and an epoxy resin has poor lubricity of the coating surface.

SUMMARY OF THE INVENTION

Accordingly, an object of the present invention is to provide a surface treatment composition which can form a surface-treated coating exhibiting excellent gas barrier properties without being affected by humidity, transparency and flexibility which does not deteriorate the physical properties of a material to be treated.

The second object of the present invention is to provide a surface-treated resin molding having the above excellent characteristics.

The third object of the present invention is to provide a high-qualify coating for preventing heat sticking in heat-sensitive heat transfer by utilizing the surface treatment composition.

A surface treatment composition of the present invention comprises at least one silane compound component selected from the group consisting of the following silane compounds:

(1) a silane compound (A) represented by the following formula (I):

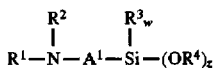 (I)

wherein $A^1$ indicates an alkylene group; $R^1$ indicates a hydrogen atom, a lower alkyl group or

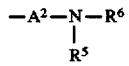

wherein $A^2$ indicates a direct bond or an alkylene group, and $R^5$ and $R^6$ each indicate a hydrogen atom or a lower alkyl group; $R^2$ indicates a hydrogen atom or a lower alkyl group; $R^3$ indicates the same or different lower alkyl groups, aryl groups or unsaturated aliphatic residues; $R^4$ indicates a hydrogen atom; a lower alkyl group or an acyl group; at least one of $R^1$, $R^2$, $R^5$ and $R^6$ is a hydrogen atom; w indicates 0, 1 or 2; z indicates an integer of 1 to 3; and w+z=3;

(2) a hydrolytic condensation product (B) of the silane compound (A): and (3) a co-hydrolytic condensation product (D) of the silane compound (A) and an organometallic compound (C) represented by the following formula (II):

 (II)

wherein M indicates a metal element.; $R^7$ may be the same or different and indicates a hydrogen atom, a lower alkyl group, an aryl group or an unsaturated aliphatic residue; $R^8$ indicates a hydrogen atom, a lower alkyl or an acyl group; m indicates 0 or a positive integer; and n indicates an integer of 1 or more; the value (m+n) being equal to the valency of metal element M;

a compound (E) having at least two functional groups Which can react with amino groups in its molecule; and solvent (F).

The surface treatment composition may comprise at least one silane compound component selected from the group consisting of (1) a silane compound (A) represented by the above formula (I), and (2) a hydrolytic condensation product (B) of a silane compound (A); an organometallic compound (C) represented by the above formula (II) and/or a hydrolytic condensation product (G) of an organometallic compound (C), a compound (E) having at least two functional groups which can react with amino groups in its molecule; and solvent (F).

The functional groups in the compound (E) which can react with amino groups are preferably at least one type selected from the group consisting of an epoxy group, an isocyanate group, a carboxyl group and an oxazolinyl group. Further, the compound (E) preferably has-an aromatic ring or a hydrogenated ring thereof in its molecule.

The above-described surface treatment composition is useful for gas barrier and can be used for coatings for preventing heat sticking in heat-sensitive heat transfer. The present invention includes a surface-treated resin molding in which at least one surface thereof is treated with the above surface treatment composition.

DESCRIPTION OF THE PREFERRED EMBODIMENTS

Figure 1:
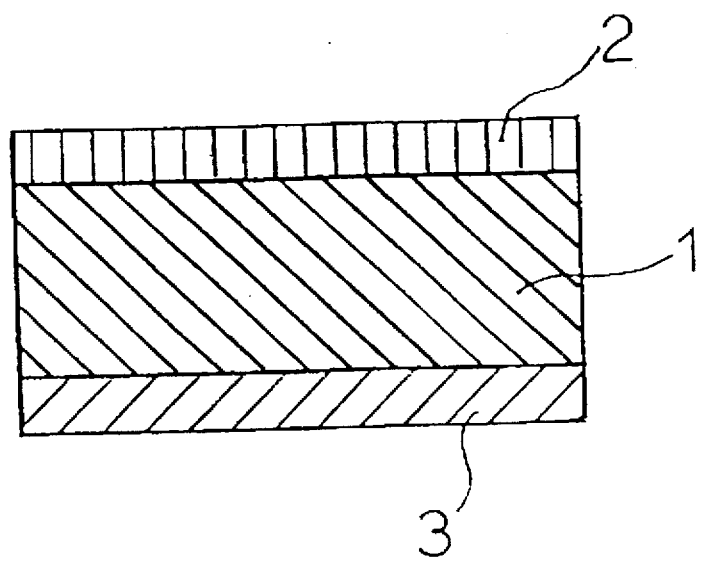
FIG. 1 is a drawing illustrating an example of application of a heat sticking preventing coating for heat-sensitive heat transfer materials.

The used components used are described in order for describing the present invention in further detail.

The silane compound (A) used in the present invention and represented by the following formula (I):

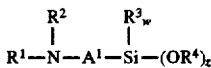 (I)

wherein $A^1$ indicates an alkylene group, $R^1$ indicates a hydrogen atom, a lower alkyl group or

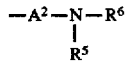

wherein $A^2$, $R^2$, $R^3$, $R^4$, $R^5$, $R^6$, w and z indicate the same as the above;

is not limited so long as the silane compound has an amino group and a hydrolytic condensable group in its molecules, as shown in formula (I).

Examples of such a silane compound (A) include
N-β(aminoethyl) γ-aminopropyltrimethoxysilane,
N-β(aminoethyl) γ-aminopropyltriethoxysilane,
N-β(aminoethyl) γ-aminopropyltriisopropoxysilane,
N-β(aminoethyl) γ-aminopropyltributoxysilane,
N-β(aminoethyl) γ-aminopropylmethyldimethoxysilane,
N-β(aminoethyl) γ-aminopropylmethyldiethoxysilane,
N-β(aminoethyl) γ-aminopropylmethyldiisopropoxysilane,
N-β(aminoethyl) γ-aminopropylmethyldibutoxysilane,
N-β(aminoethyl) γ-aminopropylethyldimethoxysilane,
N-β(aminoethyl) γ-aminopropylethyldiethoxysilane,
N-β(aminoethyl) γ-aminopropylethyldiisopropoxysilane,
N-β(aminoethyl) γ-aminopropylethyldibutoxysilane,
γ-aminopropyltrimethoxysilane,
γ-aminopropyltriethoxysilane,
γ-aminopropyltriisopropoxysilane,
γ-aminopropyltributoxysilane,
γ-aminopropylmethyldimethoxysilane,
γ-aminopropylmethyldiethoxysilane,
γ-aminopropylmethyldiisopropoxysilane,
γ-aminopropylmethyldibutoxysilane,
γ-aminopropylethyldimethoxysilane,
γ-aminopropylethyldiethoxysilane,
γ-aminopropylethyldiisopropoxysilane,
γ-aminopropylethyldibutoxysilane,
γ-aminopropyltriacetoxysilane and the like. One or more than two of these compounds can be used.

A compound (B) is previously obtained by hydrolytic condensation of at least one of the above silane compound (A). For example, when γ-aminopropyltrimethoxysilane is used as compound (A), hydrolytic condensation reaction is represented by the formulas below.

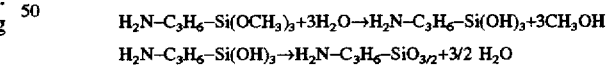

The reaction of hydrolytic condensation proceeds in the presence of the silane compound (A) and water, it is favorable for the surface treatment composition to react in solvent (F) which will be described below. The molar ratio A/W of the silane compound (A) to water is preferably 0.1 to 3. With a molar ratio of less than 0.1, gelation comes to easily occur during condensation. With a molar ratio of more than 3, much time is required for the reaction, and the silane compound might remain unreacted. The reaction time is not limited, but it is preferable to complete the hydrolytic condensation reaction. This is because when the silane compound (B) previously obtained by condensation is used, sufficient hydrolytic condensation can prevent the occurrence of cracks in a surface-treated coating due to less volumetric shrinkage thereof.

The surface treatment composition of the present invention can contain a co-hydrolytic condensation product (D) of the silane compound (A) and an organometallic compound (C). The organometallic compound (C) which can form the product of co-hydrolytic condensation with the silane compound (A) is not limited so long as the compound (C) is represented by the formula (II) below.

wherein M, $R^7$, $R^8$, m and n indicate the same as the above.

Examples of such an organometallic compound (C) include alkoxysilanes such as tetramethoxysilane, tetraethoxysilane, tetraisopropoxysilane, tetrabutoxysilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, dimethyldimethoxysilane, dimethyldiethoxysilane, dimethyldiisopropoxysilane, dimethyldibutoxysilane, diethyldimethoxysilane, diethyldiethoxysilane, diethyldiisopropoxysilane, diethyldibutoxysilane, vinyltrimethoxysilane, vinyltriethoxysilane, γ-glycidoxypropyltrimethoxysilane, γ-glycidoxypropyltriethoxysilane, γ-methacryloxypropyltrimethoxysilane, γ-chloropropyltrimethoxysilane, γ-mercaptopropyltrimethoxysilane and the like; titanium alkoxides such as titanium tetraethoxide, titanium tetraisopropoxide, titanium tetrabutoxide and the like; zirconium alkoxides such as zirconium tetraethoxide, zirconium tetraisopropoxide, zirconium tetrabutoxide and the like; aluminum alkoxides such as aluminum triethoxide, aluminum triisopropoxide, aluminum tributoxide and the like; acyloxysilanes such as tetraacetoxysilane, methyltriacetoxysilane and the like; silanols such as trimethylsilanol and the like. The co-hydrolytic condensation product (D) is produced by hydrolysis and condensation of at least one of the organometallic compounds with the silane compound (A). The reaction may be effected under the same conditions as the above-described conditions for hydrolytic condensation of the silane compound (A).

The silane compound component used in the surface treatment composition of the present invention comprises at least one selected from the group consisting of the silane compound (A), the hydrolytic condensation product (B) of the silane compound (A), and the co-hydrolytic condensation product (D) of the organometallic compound (C) and the silane compound (A). In the present invention, combination of one or both of the silane compound (A) and the hydrolytic condensation product (B) of the silane compound (A), and one or both of a hydrolytic condensation production (G) of the organometallic compound (C), and the organometallic compound (C) can also be used as the silane compound component. The organometallic compound (C) or the hydrolytic condensation product (G) thereof is effective for improving the chemical resistance and heat resistance of a coating. In this case, the organometallic compound (C) and/or the hydrolytic condensation product (6) thereof is preferably used in an amount of 0 to 200 mol %, and more preferably 0 to 100 mol %, based on the silane compound component. Use of more than 200 mol % sometimes causes the formation of particles with amine in the silane compound component, which serves as a catalyst, and thus rapidly produces gelation.

A compound (E) used in the present invention has at least two functional groups which can react with the amino groups in the molecule of the silane compound component, and is used as a cross-linking agent for the silane compound component. The functional groups which can react with amino groups are epoxy groups, carboxyl groups, isocyanate groups, oxazolinyl groups and the like, and they may be the same or different in the compound (E). From the viewpoint of reactivity, epoxy or isocyanate groups are preferable. When it is necessary to improve the humidity resistance of the surface-treated coating obtained by the composition of the present invention, the compound (E) preferably has an aromatic ring or a hydrogenated ring thereof in its molecule. Examples of such a compound (E) include aliphatic diglycidyl ethers such as ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidylether, dipropylene glycol diglycidyl ether, tripropylene glycol diglycidyl ether, 1,6-hexanediol diglycidyl ether, neopentyl glycol diglycidyl ether, glycerol diglycidyl ether and the like; polyglycidyl ethers such as glycerol triglycidyl ether, diglycerol triglycidyl ether, triglycidyl tris(2-hydroxyethyl) isocyanurate, trimethylolpropane triglycidyl ether, pentaerythritol tetraglycidyl ether and the like; aliphatic and aromatic diglycidyl esters such as diglycidyl adipate, diglycidyl o-phthalate and the like; glycidyl compounds having an aromatic ring or a hydrogenated ring thereof (including nucleus-substituted derivatives) such as bisphenol A diglycidyl ether, resorcinol diglycidyl ether, hydroquinone diglycidyl ether, bisphenol S diglycidyl ether, bisphenol F diglycidyl ether, compounds represented by the following formulas:

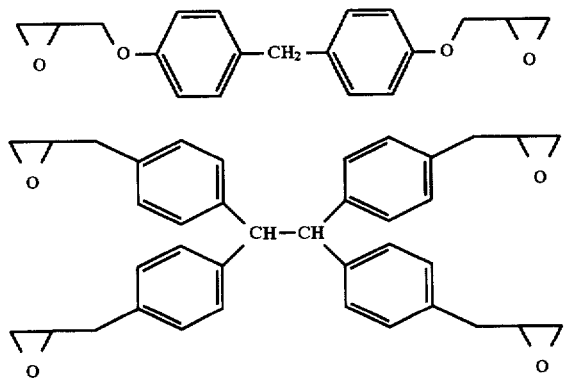

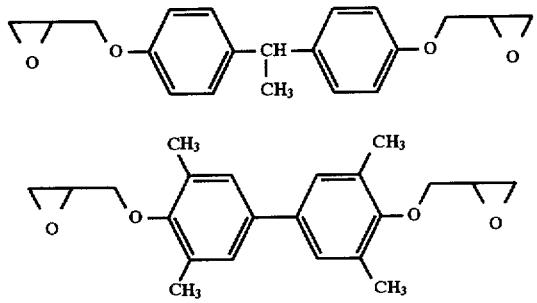

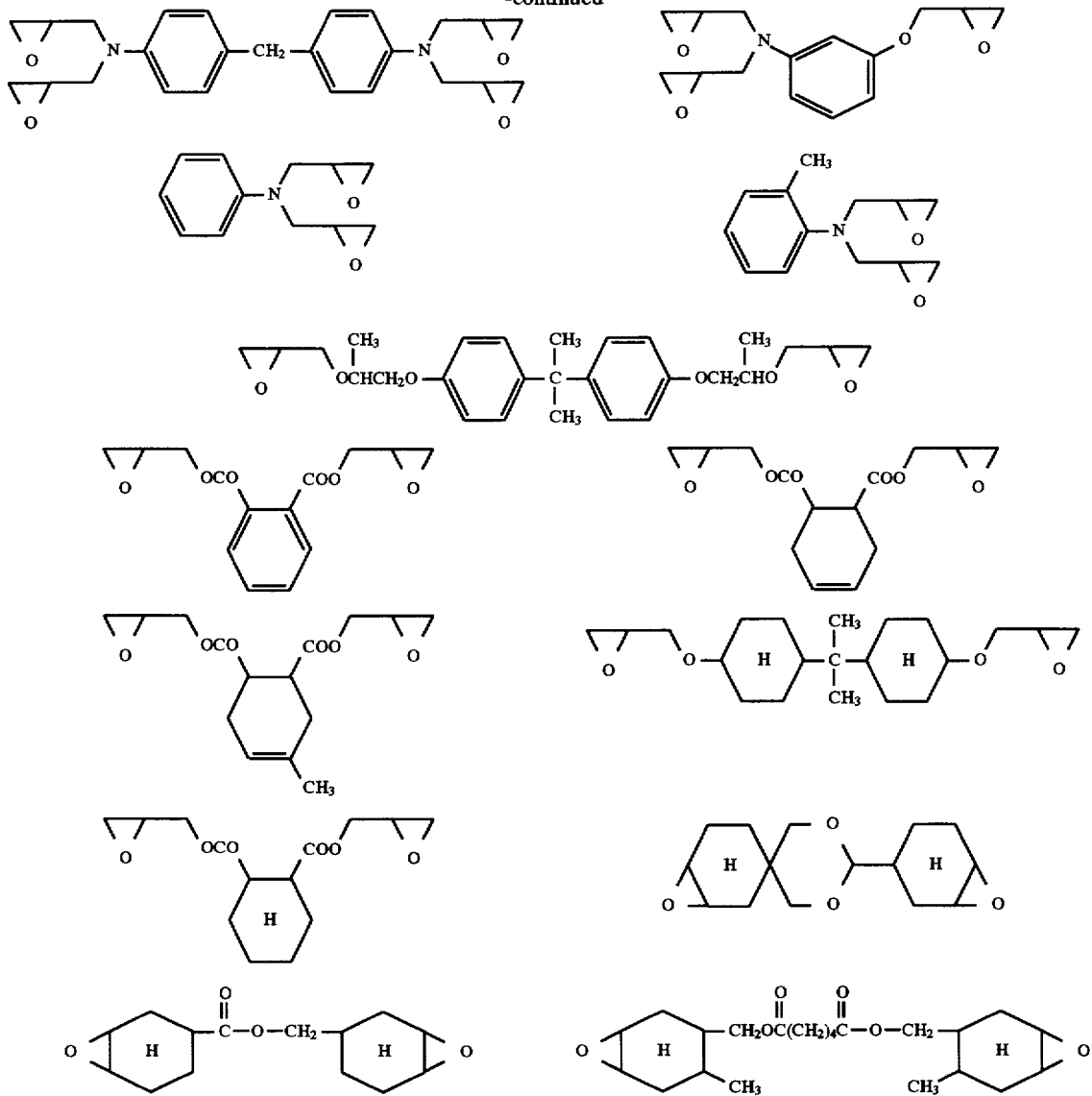

oligomers having glycidyl groups as functional groups, such as bisphenol A diglycidyl ether oligomer represented by the following formula:

diisocyanate and the like; dicarboxylic acids such as tartaric acid, adipic acid and the like; carboxyl group-containing polymers such as polyacrylic acid and the like; oxazolinyl

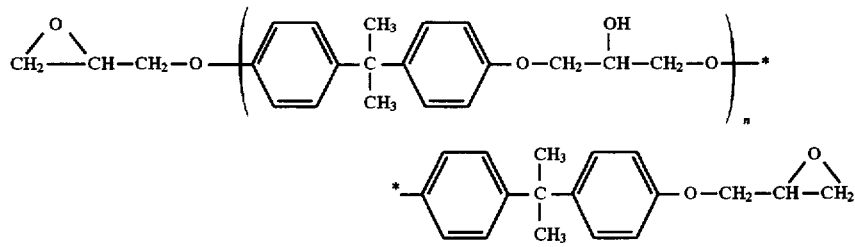

n=0 or an integer of 1 or more isocyanates such as hexamethylene diisocyanate, tolylene, diisocyanate, 1,4-diphenylmethane diisocyanate, 1,5-naphthalene diisocyanate, triphenylmethane triisocyanate, tolidine diisocyanate, xylylene diisocyanate, dicyclohexylmethane group-containing polymers and the like. At least one of these compounds can be used.

The used amount of the compound (E) is preferably 0.1 to 300% by weight, more preferably 1 to 200% by weight, relative to the total amount of the silane compound component. The compound (E) reacts with the amino groups in the silane compound component and functions as a cross-linking agent component. If the amount of the compound (E) is less than 0.1% by weight, the obtained coating exhibits insufficient flexibility. The use of more then 300% by weight of the compound (E) possibly deteriorates gas barrier properties, and is thus undesirable.

As described above, the surface treatment composition of the present invention contains, as the silane compound component which reacts with the compound (E), the following compounds:

(1) the silane compound (A);

(2) the hydrolytic condensation product (B) of the silane compound (A).

(3) the co-hydrolytic condensation product (D) of the silane compound (A) and the organometallic compound (C); or combination of the compound (A) and/or the compound (B) and the hydrolytic condensation product (G) of the organometallic compound (C) and/or the organometallic compound (C). The surface treatment composition may contain the silane compound in the following form:

(4) a reaction product (AE) of the silane compound (A) and the compound (E);

(5) a hydrolytic condensation product (PAE) of the silane compound (A) before or after reaction with the compound (E);

(6) a reaction product (AEC) of the silane compound (A), the compound (E) and the organometallic compound (C); or (7) a (co)-hydrolytic condensation product (PAEC) of the silane compound (A) before and after reaction with the compound (E) and the organometallic compound (C).

Each of forms (5) and (7) is further divided into the following forms:

Form (5)

(8) A reaction product of the hydrolytic condensation product of the silane compound (A) and the compound (E);

(9) A hydrolytic condensation product of the reaction product of the silane compound (A) and the compound (E).

Form (7)

(10) A reaction product of the hydrolytie condensation product of the silane compound (A), the compound (E) and the organometallic compound (C);

(11) A co-hydrolytie condensation product of the silane compound (A), the compound (E) and the organometallic compound (C) after reaction thereof.

Silane compounds in all forms (1) to (11) can be used for the reactive silane compound component having residual amino groups or silane portions which can product crosslinking reaction or hydrolytic condensation.

Solvent (F) used in the present invention is not limited so long as the solvent will dissolve the silane compound component and the compound (E). Examples of solvents include alcohols such as methanol, ethanol, 2-propanol, butanol, pentanol, ethylene glycol, diethylene glycol, triethylene glycol, ethylene glycol monomethyl ether, diethylene glycol monomethyl ether, triethylene glycol monomethyl ether and the like; ketones such as acetone, methyl ethyl ketone, methyl isobutyl ketone, cyclohexanone and the like; aromatic hydrocarbons such as toluene, benzene, xylene and the like; hydrocarbons such as hexane, heptane, octane and the like; acetates such as methyl acetate, ethyl acetate, propyl acetate, butyl acetate and the like; other solvents such as ethyl phenol ether, propyl ether, tetrahydrofuran and the like. Only one or a mixture of at least two solvents can be used. Alcohols among these solvents are preferably used. The hydrolytic condensation reaction is preferably undergone in these solvents.

The surface treatment composition of the present invention can contain inorganic and organic various additives such as a curing catalyst, a wettability improving agent, a plasticizer, an anti-foaming agent, a thickener etc. within the range which does not deteriorate the effect of the invention, according to demand.

A resin molding is used as a substrate to be coated with the surface treatment composition of the present invention. The resin used for molding is not limited. Examples of such resins include polyolefin resins such as polyethylene, polypropylene and the like; polyester resins such as polyethylene terephthalate, polyethylene isophthalate, polyethylene-2,6-naphthalate, polybutylene terephthalate, copolymers thereof and the like; polyamide resins such as polyoxymethylene resins; thermoplastic resins such as polystyrene, poly(meth)acrylate, polyacrylonitrile, polyvinyl acetate, polycarbonate, cellophane, polyimide, polyetherimide, polyphenylenesulfone, polysulfone, polyether ketone, ionomer resins, fluororesins and the like; thermosetting resins such as melamine resins, polyurethane resins, epoxy resins, phenolic resins, unsaturated polyester resins, alkyl resins, urea resins, silicone resins and the like.

The shape of the molding can be selected from a film, a sheet, a bottle and so on according to application. A thermoplastic film is preferable from the viewpoint of the ease of processing.

The method of coating the resin molding with the surface treatment composition is not limited, and a roll coating method, a dip coating method, a bar coating method, a nozzle coating method and the like or combination thereof is used. The resin molding can be subjected to surface activation treatment such as corona treatment, or known anchoring treatments using an urethane resin and the like before coating. After the resin molding is coated with the surface treatment composition, lamination treatment or other known treatments may be made.

After coating, the coated film is cured and dried. Although the surface treatment composition of the present invention is cured and dried at room temperature, the resin molding may be heated to a temperature below the heat resistant temperature thereof for more rapidly curing and drying it. The coating thickness after drying is preferably 0.001 to 20 µm, more preferably 0.01 to 10 µm. With a thickness of less than 0.001 µm, a uniform coating cannot be obtained, and pinholes easily occur. A thickness of more than 20 µm is undesirable because cracks easily occur in the coating.

The surface treatment composition of the present invention is useful for giving gas barrier properties to the resin molding, and can also be used for a heat sticking preventing agent for heat-sensitive transfer. An example of such application is shown in FIG. 1. A heat transfer ink layer 2 is provided on one side of a base film 1, and a heat sticking preventing layer 3 comprising a heat sticking preventing agent of the present invention is provided on the other side thereof to form a heat-sensitive heat transfer material. The heat transfer ink layer 2 comprises a conventional heat-meltable ink layer or a heat-sublimable dye-containing layer, and is formed by a conventional known coating or printing method. The heat sticking preventing layer 3 of the present invention has heat resistance, good slip properties and the large ability to prevent heat sticking, and can be applied to the base film by a conventional coating or printing machine.

If required, an adhesive layer can be interposed between the base film 1 and the heat sticking preventing layer 3. The thickness of the heat sticking preventing layer 3 is preferably 0.1 to 5 µm. The heat sticking preventing layer 3 can be formed by a conventional known coating or printing method using the surface treatment composition of the present invention. In the formation, a curing catalyst may be used according to demand.

A conventional film can be used as the base film. Examples of such films include polyester films, polycarbonate films, cellulose acetate films, polypropylene films, cellophane and the like.

In the surface treatment composition of the present invention, it is possible to securely prevent the occurrence of cracks by using, as the silane compound component, a large amount of the hydrolytic condensation product (B) or (D) which exhibits less volumetric shrinkage during curing. The combination of the organometallic compound (C) and the hydrolytic condensation product (G) thereof is effective for improving the heat resistance and chemical resistance of the coating.

EXAMPLES

The present invention is described in detail below with reference to examples, but the invention is not limited to these examples.

In characteristic tests, the following evaluation methods were employed:

(Oxygen permeability)

Measured at 20° C. in accordance with JIS K 7126 method B.

(Flexibility)

The surface treatment composition was coated to a predetermined thickness on a polyethylene terephthalate (abbreviated to PET hereinafter) film of 12 μm, and the dry coated film was then bent at 180°. Mark ○ indicates no occurrence of cracks, and mark x indicates the occurrence of cracks.

(Transparency)

A PET film which was coated by the same method as in the flexibility evaluation test was visually compared with an untreated film. Mark ○ indicates no difference in transparency, and mark x indicates the occurrence of turbidity such as white turbidity.

REFERENCE (Pretreatment of resin molding)

25 g of urethane coating agent Takenate A-3 (produced by Takeda Yakuhin-Kogyo-KK.), 150 g of Takerack A-310 (produced by Takeda Yakuhin-Kogyo-KK.) and 500 g of ethyl acetate were mixed to obtain an urethane undercoating agent. The undercoating agent was coated to a thickness of 2.0 μm on a 12 μm PET film by the dipping method, and then dried at 120° C. for 30 minutes. The thus-obtained film was transparent and exhibited flexibility shown by mark ○ and oxygen permeability of 70.01 cc/m$^2$.24 hrs.atm.

EXAMPLE 1

2 g of ethylene glycol diglycidyl ether (abbreviated to "1EDGE" hereinafter) was added to a mixture of 15 g of γ-aminopropyltrimethoxysilane (abbreviated to "APTM" hereinafter) and 120 g of methanol, and the resultant mixture was then stirred at 21° C. for 5 hours to obtain surface treatment composition 1. This composition 1 was coated to a thickness of 0.2 μm by the dipping method on the resin molding obtained in Reference Example 1, and then dried by allowing it to stand at 21° C. for 24 hours. The thus-obtained surface-treated film was transparency and exhibited flexibility shown by mark ○ and oxygen permeability of 6.12 cc/m$^2$.24 hrs.atm.

EXAMPLE 2

15 g of APTM, 60 g of methanol and 1.5 g of water were mixed, and the resultant mixture was stirred at 21° C. for 24 hours to obtain APTM hydrolytic condensation product. 2 g of 1EDGE was then added to the APTM hydrolytic condensation product solution, and the, resultant mixture was stirred at 21° C. for 24 hours to obtain a surface treatment composition. The composition was coated to a thickness of 0.4 μm on the resin molding obtained in Reference Example 1 by the dipping method, and then dried by allowing it to stand at 21° for 24 hours. The thus-obtained surface treated film was transparency and exhibited flexibility shown by mark ○ and oxygen permeability of 2.92 cc/m$^2$.24 hrs.atm.

EXAMPLES 3 to 13

Surface-treated films were formed by the same method as Example 2 except that conditions were changed, as shown in Table 1, and then subjected to characteristic tests. The results of the tests are shown in Table 1.

EXAMPLE 14

15 g of APTM, 120 g of methanol and 1.5 g of water were mixed, and the resultant mixture was stirred at 21° C. for 24 hours to obtain APTM hydrolytic condensation product. 2 g of 1EDGE was then added to the APTM hydrolytic condensation product solution, and the resultant mixture was stirred at 21° C. for 5 hours, and 5 g of tetramethoxysilane (referred to as "TMOS" hereinafter) was added to the solution to obtain a surface treatment composition. The composition was coated, dried and then subjected to characteristic tests by the same method as Example 1. The obtained results are shown in Table 1.

EXAMPLE 15

15.8 g of TMOS, 124.8 g of methanol, 3.0 g of water and 0.4 g of concentrated hydrochloric acid were mixed, and the resultant mixture was stirred at 21° C. for 24 hours to obtain TMOS hydrolytic condensation product. 15 g of APTM and 2 g of 1EDGE were then added to the TMOS hydrolytic condensation product solution, and the resultant mixture was stirred at 21° C. for 5 hours to obtain a surface treatment composition. The composition was coated, dried and then subjected to characteristic tests by the same method as Example 1. The obtained results are shown in Table 1.

EXAMPLE 16

15 g of APTM, 120 g of methanol and 2 g of 1EDGE were mixed, and the resultant mixture was then stirred at 21° C. for 5 hours. 5 g of TMOS was then added to the mixture to obtain a surface treatment composition. The composition was coated, dried and then subjected to characteristic tests by the same method as Example 1. The obtained results are shown in Table 1.

The compounds below are abbreviated as follows:

APTM: γ-aminopropyltrimethoxysilane

APTE: γ-aminopropyltriethoxysilane

NAEAPTM: N-β(aminoethyl) γ-aminopropyl trimethoxysilane.

TMOS: tetramethoxysilane

TEOS: tetraethoxysilane

MTMOS: methyltrimethoxysilane

TBOT: titanium tetrabutoxide

GPTM: γ-glycidoxypropyltrimethoxysilane

VTM: vinyltrimethoxysilane

1EDGE: ethylene glycol diglycidyl ether

2EDGE: diethylene glycol diglycidyl ether

4EDGE: tetraethylene glycol diglycidyl ether
PE4GE: pentaerythritol tetraglycidyl ether
EG: ethylene glycol
HMDA: hexamethylenediamine for 24 hours to obtain an APTM hydrolytic condensation product. 2 g of 1EDGE was added to the APTM hydrolytic condensation product, and the resultant mixture was then stirred at 21° C. for 5 hours to obtain a surface treatment composition. This surface treatment composition was

TABLE 1

| Example No. | Silane Compound Component Silane Compound · Metalic Compound | Polyfunctional Compound | Coating Thickness μm | Flexibility | Transparency | Oxygen* Permeability |
|---|---|---|---|---|---|---|
| Reference | (Substrate + Undercoat) | — | | ○ | ○ | 70.01 |
| 1 | APTM (15 g) | 1EDGE (2 g) | 0.2 | ○ | ○ | 6.12 |
| 2 | Hydrolytic Condensation Product of APTM (15 g) | 1EDGE (2 g) | 0.4 | ○ | ○ | 2.92 |
| 3 | Hydrolytic Condensation Product of APTM (15 g) | 2EDGE (2 g) | 0.5 | ○ | ○ | 4.92 |
| 4 | Hydrolytic Condensation Product of APTM (15 g) | 4EDGE (2 g) | 0.7 | ○ | ○ | 5.17 |
| 5 | Hydrolytic Condensation Product of APTM (15 g) | PE4GE (2 g) | 0.5 | ○ | ○ | 6.33 |
| 6 | Hydrolytic Condensation Product of APTM (15 g) | 1EDGE (4 g) | 0.8 | ○ | ○ | 4.52 |
| 7 | Hydrolytic Condensation Product of APTM (15 g) | 1EDGE (6 g) | 0.9 | ○ | ○ | 4.89 |
| 8** | Hydrolytic Condensation Product of APTM (15 g) | 1EDGE (2 g) | 0.5 | ○ | ○ | 3.56 |
| 9 | Hydrolytic Condensation Product of APTE (15 g) | 1EDGE (2 g) | 0.4 | ○ | ○ | 8.59 |
| 10 | Hydrolytic Condensation Product of NAEAPTM (15 g) | 1EDGE (2 g) | 0.4 | ○ | ○ | 9.87 |
| 11 | Cohydrolytic Condesation Product of APTM (15 g) and TMOS (1 g) | 4EDGE (2 g) | 0.5 | ○ | ○ | 8.92 |
| 12 | Cohydrolytic Condesation Product of APTM (15 g) and MTMOS (1 g) | 4EDGE (2 g) | 0.4 | ○ | ○ | 7.65 |
| 13 | Cohydrolytic Condesation Product of APTM (15 g) and TBOT (1 g) | 4EDGE (2 g) | 0.4 | ○ | ○ | 9.97 |
| 14 | Mixture of Hydrolytic Condensation Product of APTM (15 g) and TMOS (5 g) | 1EDGE (2 g) | 0.4 | ○ | ○ | 7.58 |
| 15 | Mixture of Hydrolytic Condensation Product of TMOS (15.8 g) and APTM (15 g) | 1EDGE (2 g) | 0.4 | ○ | ○ | 5.22 |
| 16 | Mixture of APTM (15 g) and TMOS (5 g) | 1EDGE (2 g) | 0.3 | ○ | ○ | 7.65 |

*The oxygen permeability is in [cc/m$^2$ · 24 hrs · atm].
**Drying conditions were 80° C. and 30 min. in Example 8, and 21° C. and 24 hrs. in the other examples.

COMPARATIVE EXAMPLE 1

15 g of APTM and 120 g of methanol were mixed, coated directly on the resin molding obtained in Reference Example 1, and then dried. The coating layer of the thus-obtained surface treated film had a thickness of 0.1 μm and was transparent. The flexibility was shown by mark x, and the oxygen permeability was 5.98 cc/m$^2$.24hrs.atm.

COMPARATIVE EXAMPLE 2

15 g of APTM, 60 g of methanol and 1.5 g of water were mixed, and the resultant mixture was then stirred at 21° C. for 24 hours to obtain an APTM hydrolytic condensation product. This APTM hydrolytic condensation product was coated directly on the resin molding obtained in Reference Example 1, and then dried. The thus-obtained coating layer had a thickness of 0.3 μm and was transparent. The flexibility was shown by mark x, and the oxygen permeability was 2.70 cc/m$^2$.24 hrs.atm.

COMPARATIVE EXAMPLES 3 to 10

Surface-treated films were formed by the same method as Comparative Example 1 except the conditions were changed as shown in Table 2, and then subjected to characteristic tests. The obtained results are shown in Table 2.

REFERENCE EXAMPLE 15 g of APTM, 5 g of methanol and 1.5 g of water were mixed, and the resultant mixture was then stirred at 21° C. thickly coated on the resin molding obtained in Reference Example 1, and then dried. The thus-obtained coating layer had a thickness of 21.0 μm and was transparent. The flexibility was shown by mark x, and the oxygen permeability was 69.21 cc/m$^2$.24 hrs.atm.

COMPARATIVE EXAMPLE 12

15 g of APTM, 120 g of methanol and 1.5 g of water were mixed, and the resultant mixture was then stirred at 21° C. for 24 hours to obtain an APTM hydrolytic condensation product. 5 g of TMOS was added to the APTM hydrolytic condensation product solution to obtain a surface treatment composition. This surface treatment composition was coated, dried and then subjected to characteristic tests. The obtained results are shown in Table 2.

COMPARATIVE EXAMPLE 13

15.8 g of TMOS, 124.8 g of methanol, 3.0 g of water and 0.4 g of concentrated hydrochloric acid were mixed, and the resultant mixture was then stirred at 21° C. for 24 hours to obtain a TMOS hydrolytic condensation product. 15 g of APTM was added to the TMOS hydrolytic condensation product solution to obtain a surface treatment composition. This surface treatment composition was coated, dried and then subjected to characteristic tests by the same method as Example 1. The obtained results are shown in Table 2.

COMPARATIVE EXAMPLE 14

15 g of APTM and 120 g of methanol were mixed, and 5 g of TMOS was then added to the resultant to obtain a surface treatment composition. This surface treatment composition was coated, dried and then subjected to characteristic tests by the same method as Example 1. The obtained results are shown in Table 2.

hour, and the resultant mixture was further stirred for 2 hours to obtain polymer solution 2.

The thus-obtained polymer solution 2 was coated on one side of a PET base film having a thickness of 6 μm by a bar

TABLE 2

| Comparative** Example No. | Silane Compound Component Silane Compound-Metalic Compound | Polyfunctional Compound | Coating Thickness μm | Flexibility | Transparency | Oxygen* Permeability |
|---|---|---|---|---|---|---|
| Reference | (Substrate + Undercoat) | — | | ○ | ○ | 70.01 |
| 1 | APTM (15 g) | — | 0.1 | x | ○ | 5.98 |
| 2 | Hydrolytic Condensation Product of APTM (15 g) | — | 0.1 | x | ○ | 2.70 |
| 3 | Hydrolytic Condensation Product of APTM (15 g) | EG (2 g) | 0.3 | x | x | 68.19 |
| 4 | Hydrolytic Condensation Product of APTM (15 g) | 1EDGE (0.01 g) | 0.2 | x | ○ | 2.81 |
| 5 | Hydrolytic Condensation Product of APTM (15 g) | 1EDGE (60 g) | 5.0 | ○ | x | 51.34 |
| 6 | Hydrolytic Condensation Product of GPTM (15 g) | 1EDGE (2 g) | 0.5 | x | x | 69.25 |
| 7 | Hydrolytic Condensation Product of VTM (15 g) | 1EDGE (2 g) | 0.4 | x | x | 67.37 |
| 8 | Hydrolytic Condensiaton Product of TEOS (15 g) | 1EDGE (2 g) | 0.5 | x | x | 67.99 |
| 9 | Hydrolytic Condensation Product of GPTM (15 g) | HMDA (2 g) | immeasurable due to gelation | | | |
| 10 | Cohydrolytic Condesation Product of APTM (2 g) and TMOS (6 g) | 1EDGE (2 g) | 0.8 | x | x | 68.72 |
| Reference Example | Hydrolytic Condensiaton Product of APTM (15 g) | 1EDGE (2 g) | 21.0 | x | ○ | 69.21 |
| 12 | Mixture of Hydrolytic Condensation Product of APTM (15 g) and TMOS (5 g) | — | 0.3 | x | ○ | 8.10 |
| 13 | Mixture of Hydrolytic Condensation Product of TMOS (1 g) and APTM (15 g) | — | 0.3 | x | ○ | 6.59 |
| 14 | Mixture of APTM (15 g) and TMOS (5 g) | — | 0.2 | x | ○ | 8.23 |

*The oxygen permeability is in [cc/m² · 24 hrs · atm].
**In all comparative examples, drying conditions were 21° C. and 24 hrs.

EXAMPLE 17

2.0 g of water was added to 100 g of methanol, and the resultant mixture was stirred. 20 g of γ-aminopropyltrimethoxysilane was dropwisely added to the mixture at 30° C. over 30 minutes. After stirring at 30° C. for 30 minutes, 3 g of diethylene glycol diglycidyl ether was added to the mixture, and the resultant mixture was further stirred for 1 hour to obtain polymer solution 1.

The thus-obtained polymer solution i was coated on one side of a PET base film having a thickness of 6 μm by a bar coater, and then dried under heating to form a heat sticking preventing layer having a thickness of 1.5 μm. A heat transfer ink layer having a thickness of 2 μm was formed on the other side of the base film to obtain heat-sensitive heat transfer material (1).

A heat transfer test of the thus-obtained heat-sensitive heat transfer material (1) was performed on recording paper by using a thermal head printing test apparatus (produced by Matsushita-Denshi-Buhin-KK.). In the heat transfer test, the presence of the heat sticking phenomenon was evaluated by observing the running state of the thermal head. After the heat transfer test, the contamination state of the thermal head was also examined. The results obtained are shown in Table 3. The test conditions were an applied voltage of 20 V and a printing speed of 2 milliseconds.

EXAMPLE 18

20 g of γ-aminopropyltriethoxysilane and 4 g of ethylene glycol diglycidyl ether were mixed, and the resultant mixture was stirred at 30° C. for 3 hours. 100 g of ethanol and 2.0 g of water were dropwisely added to the mixture over 1 coater, and then dried to form a heat sticking preventing layer having a thickness of 1.5 μm. A heat transfer ink layer having a thickness of 2 μm was formed on the other side of the base film to obtain heat-sensitive heat transfer material (2). The performance of the heat-sensitive heat transfer material (2) was evaluated by the same method as Example 17. The results obtained are shown in Table 3.

EXAMPLE 19

1.5 g of water was added to 100 g of ethanol, and the resultant mixture was then stirred. 20 g of N-β(aminoethyl) γ-aminopropyltrimethoxysilane was dropwisely added to the mixture at 30° C. over 30 minutes. After stirring at 30° C. for 3 hours, 2 g of nonaethylene glycol diglycidyl ether was added to the mixture, the resultant mixture was further stirred for 1 hour to obtain polymer solution 3.

The thus-obtained polymer solution 3 was coated on one side of a PET base film having a thickness of 6 μm by a bar coater, and then dried under heating to form a heat sticking preventing layer having a thickness of 1.5 μm. A heat transfer ink layer having a thickness of 2 μm was formed on the other side of the base film to obtain heat-sensitive heat transfer material (3). The performance of the heat-sensitive heat transfer material (3) was evaluated by the same method as Example 17. The obtained results are shown in Table 3.

COMPARATIVE EXAMPLE 15

A heat sticking preventing agent for heat-sensitive heat transfer material was prepared for comparison by the same method as Example 17 except that diethylene glycol diglycidyl ether was not used. Like in Example 17, a heat sticking preventing layer was formed by using the thus-obtained heat sticking preventing agent, and a heat transfer ink layer was then provided to obtain comparative heat transfer material (1). The performance of the comparative heat transfer material (1) was evaluated by the same method as Example 17. The obtained results are shown in Table 3.

COMPARATIVE EXAMPLE 16

A polymer solution was prepared by the same method as Example 18 except that diethylene glycol dimethyl ether was used in place of ethylene glycol diglycidyl ether. Like in Example 18, a heat sticking preventing layer was formed by using the thus-obtained polymer solution, and a heat transfer ink layer was then provided to obtain comparative heat transfer material (2). The performance of the comparative heat transfer material (2) was evaluated by the same method as Example 17. The obtained results are shown in Table 3.

COMPARATIVE EXAMPLE 17

A comparative heat transfer material (3) was obtained by the same method as Example 17 except that the heat sticking preventing layer was not formed. The performance of the comparative heat transfer material (3) was evaluated by the same method as Example 17. The obtained results are shown in Table 3.

TABLE 3

| | Heat-sensitive heat transfer material used in heat transfer test | Presence of heat sticking | Contamination of thermal head |
|---|---|---|---|
| Example 17 | Heat-sensitive heat transfer material(1) | No | No |
| Example 18 | Heat-sensitive heat transfer material(2) | No | No |
| Example 19 | Heat-sensitive heat transfer material(3) | No | No |
| Comparative Example 15 | Comparative heat transfer material(1) | slightly present* | No |
| Comparative Example 16 | Comparative heat transfer material(2) | present | present |
| Comparative Example 17 | Comparative heat transfer material(3) | present | present** |

*The thermal head was not smoothly run.
**The melted polyester film adhered.

EXAMPLE 20

50 g of APTE, 30 g of 2-propanol, and 7 g of xylylene diisocyanate were charged in a flask equipped with a stirrer, a thermometer and a condenser, and were reacted under heating at 70° C. for 3 hours. After cooling, 1.5 g of water and 100 g of 2-propanol were added to the reaction solution to obtain gas barrier surface treatment composition 20. This composition 20 was coated to a thickness of 2.0 μm on a PET film having a thickness of 12 μm by a bar coater, and then dried at 80° C. for 10 minutes. The physical properties of the thus-obtained surface-treated film are shown in Table 4.

EXAMPLES 21 to 26

Surface-treated films were formed by the same method as Example 20 except that various conditions were changed as shown in Table 4, and then subjected to characteristic tests. The results obtained are shown in Table 4.

EXAMPLE 27

50 g of APTE, 3 g of TEOS, 30 g of 2-propanol, and 25 g of bisphenol A diglycidyl ether were charged in a flask equipped with a stirrer, a thermometer and a condenser, and were reacted under heating at 70° C. for 3 hours. After cooling, 1.5 g of water and 100 g of 2-propanol were added to the reaction solution to obtain gas barrier surface treatment composition 27. A surface-treated film was obtained by the same method as Example 20 except that the composition 27 was used. The results of characteristic evaluation are shown in Table 4.

EXAMPLES 28 and 29

Surface-treated films were formed by the same method as Example 20 except that various conditions were changed as shown in Table 4, and subjected to characteristic tests. The obtained results are shown in Table 4.

EXAMPLE 30

50 g of APTE, 30 g of 2-propanol, and 1.5 g of water were charged in a flask equipped with a stirrer, a thermometer and a condenser, and the resultant mixture was stirred at 21° C. for 24 hours to obtain an APTE hydrolytic condensation product. 25 g of bisphenol A diglycidyl ether and 100 g of 2-propanol were added to the APTE hydrolytic condensation product solution, and the resultant mixture was reacted at 70° C. for 3 hours and then cooled to obtain gas barrier surface treatment composition 30. A surface-treated film was formed by the same method as Example 20. The results of characteristic evaluation are shown in Table 4.

EXAMPLE 31

50 g of APTE, 5 g TEOS, 30 g of 2-propanol, and 1.5 g of water were charged in a flask equipped with a stirrer, a thermometer and a condenser, and the resultant mixture was stirred at 21° C. for 24 hours to obtain a co-hydrolytic condensation product of APTE and TEOS. 15 g of resorcinol diglycidyl ether and 100 g of 2-propanol were added to the co-hydrolytic condensation product solution, and the resultant mixture was reacted at 70° C. for 3 hours and then cooled to obtain gas barrier surface treatment composition 31. A surface-treated film was formed by the same method as Example 20. The results of characteristic evaluation are shown in Table 4.

EXAMPLE 32

50 g of APTM, 10 g of bisphenol A diglycidyl ether, and 30 g of 2-propanol were charged in a flask equipped with a stirrer, a thermometer and a condenser, followed by heating at 70° C. for 3 hours and then cooling to obtain gas barrier surface treatment composition 32. A surface-treated film was formed by the same method as Example 20. The results of characteristic evaluation are shown in Table 4.

EXAMPLE 33

50 g of APTM, 10 g of hydroquinone diglycidyl ether, and 30 g of 2-propanol were charged in a flask equipped with a stirrer, a thermometer and a condenser, followed by heating at 70° C. for 3 hours and then cooling. 5 g of TEOS and 100 g of 2-propanol were further added to the mixture to obtain gas barrier surface treatment composition 33. A surface-treated film was formed by the same method as Example 20. The results of characteristic evaluation are shown in Table 4.

EXAMPLE 34

50 g of APTE, 3 g of TMOS and 10 g of resorcinol diglycidyl ether were charged in a flask equipped with a stirrer, a thermometer and a condenser, followed by heating at 70° C. for 3 hours and then cooling to obtain gas barrier surface treatment composition 34. A surface-treated film was formed by the same method as Example 20. The results of characteristic evaluation are shown in Table 4.

COMPARATIVE EXAMPLE 18

50 g of TEOS, 25 g of bisphenol A diglycidyl ether and 30 g of 2-propanol were charged in a flask equipped with a stirrer, a thermometer and a condenser, followed by heating at 70° C. for 3 hours and then cooling. 2.0 g of water, 200 g of 2-propanol and 0.2 g of concentrated hydrochloric acid were added to the mixture, and the resultant mixture was stirred at 21° C. for 24 hours to obtain comparative surface treatment composition 18. A surface-treated film was formed by the same method as Example 20. The results of characteristic evaluation are shown in Table 5.

shown in Table 5, and then subjected to characteristic tests. The obtained results are shown in Table 5.

In Tables 4 and 5, the compounds below are abbreviated as follows:

XDI: xylylene diisocyanate

TDI: tolylene diisocyanate

BisADGE: bisphenol A diglycidyl ether

RDGE: resorcinol diglycidyl ether

HQDGE: hydroquinone diglycidyl ether

PhDGE: phenyl diglycidyl ether

TABLE 4

| Example No. | Silane Compound (A) Metalic Compound (C) | Compound (B) | Coating Thickness μm | Flexibility | Transparency | Oxygen* Permeability 0% Rh | Oxygen* Permeability 85% Rh |
|---|---|---|---|---|---|---|---|
| 20 | APTE (50 g) | XDI (2 g) | 2.0 | o | o | 4.15 | 5.63 |
| 21 | APTE (50 g) | BisADGE (26 g) | 2.0 | o | o | 3.88 | 4.51 |
| 22 | APTE (50 g) | BisADGE (26 g) | 2.0 | o | o | 5.32 | 5.79 |
| 23 | APTM (50 g) | BisADGE (26 g) | 2.0 | o | o | 3.67 | 4.42 |
| 24 | NAEAPTM (50 g) | BisADGE (26 g) | 2.0 | o | o | 5.98 | 7.54 |
| 25 | APTE (50 g) | RDGE (15 g) | 2.0 | o | o | 4.09 | 5.87 |
| 26 | APTE (50 g) | TDI (7 g) | 2.0 | o | o | 6.00 | 7.93 |
| 27 | APTE (50 g) TEOS (3 g) | BisADGE (25 g) | 2.0 | o | o | 9.34 | 11.20 |
| 28 | APTE (50 g) TBOT (2 g) | BisADGE (25 g) | 2.0 | o | o | 8.97 | 10.98 |
| 29 | NAEAPTM (15 g) TEOS (3 g) | XDI (7 g) | 2.0 | o | o | 7.42 | 9.36 |
| 30 | Hydrolytic Condensation Product of APTE (50 g) | BisADGE (25 g) | 2.0 | o | o | 6.11 | 8.01 |
| 31 | Cohydrolytic Condensation Product of APTE (50 g) and TEOS (3 g) | RDGE (15 g) | 2.0 | o | o | 10.35 | 12.48 |
| 32 | APTM (50 g) | BisADGE (10 g) | 2.0 | o | o | 11.92 | 13.04 |
| 33 | APTM (50 g) TEOS (5 g) | HQDGE (10 g) | 2.0 | o | o | 14.12 | 17.39 |
| 34 | APTE (50 g) TMOS (3 g) | RDGE (10 g) | 2.0 | o | o | 13.90 | 16.33 |

*The oxygen permeability is in [cc/m² · 24 hrs. · atm].

TABLE 5

| Comparative Example No. | Silane Compound (A) Metalic Compound (C) | Compound (B) | Coating Thickness μm | Flexibility | Transparency | Oxygen* Permeability 0% Rh | Oxygen* Permeability 85% Rh |
|---|---|---|---|---|---|---|---|
| 18 | TEOS (50 g) | BisADGE (25 g) | 2.0 | x | x | 56.0 | 59.0 |
| 19 | APTE (50 g) | BisADGE (60 g) | 2.0 | o | o | 38.29 | 54.0 |
| 20 | APTE (50 g) | BisADGE (2 g) | 2.0 | x | o | 4.11 | 54.0 |

*The oxygen permeability is in [cc/m² · 24 hrs. · atm].

COMPARATIVE EXAMPLE 19

90 g of APTE, 60 g of bisphenol A diglycidyl ether and 30 g of 2-propanol were charged in a flask equipped with a stirrer, a thermometer and a condenser, followed by heating at 70° C. for 3 hours and then cooling. 1.5 g of water and 100 g of 2-propanol were added to the mixture to obtain comparative surface treatment composition 19. A surface-treated film was formed by the same method as Example 20. The results of characteristic evaluation are shown in Table 5.

COMPARATIVE EXAMPLE 20

A surface-treated film was formed by the same method as Example 20 except that various conditions were changed as The use of the surface treatment composition of the present invention enables the formation of a transparent coating exhibiting excellent gas barrier properties without being affected by humidity and flexibility. The surface-treated resin molding of the present invention is useful as a gas barrier material in the field of packaging materials and the like. The heat sticking preventing agent coating for heat-sensitive heat transfer obtained by using the surface treatment composition of the present invention exhibits excellent heat resistance and slip properties and can provide a coated film having the high ability to prevent heat sticking.

What is claimed is:

1. A surface coating composition comprising:
(A) a silane compound of the formula (I),

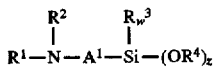

wherein $A^1$ is an alkylene group; $R^1$ is a hydrogen atom, a lower alkyl group or

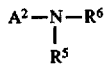

wherein $A^2$ is a direct bond or alkylene group, $R^5$ and $R^6$ each is a hydrogen atom or a lower alkyl group; $R^2$ is a hydrogen atom or a lower alkyl group; $R^3$ is the same or different lower alkyl groups, allyl groups or unsaturated aliphatic groups; $R^4$ is a hydrogen atom, a lower alkyl group or an acyl group; at least one of $R^1$, $R^2$, $R^5$ and $R^6$ is a hydrogen atom; w is 0, 1 or 2; z is an integer of 1 to 3; and w+z=3, (B) an organometallic compound of the formula (II),

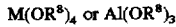

wherein M is Si, or Zr; $R^8$ is a hydrogen atom, a lower alkyl group or an acyl group;

(C) a compound having at least two functional groups selected from the group consisting of epoxy, isocyanate, carboxyl, oxazolinyl and mixtures thereof, and (D) a solvent.

2. The surface coating composition of claim 1, wherein the solvent is selected from the group consisting of alcohols, ketones, aromatic hydrocarbons, acetates, ethyl phenol ether, propyl ether, tetrahydrofuran and mixtures thereof.

3. The surface coating composition of claim 1, wherein M is Si.

4. The surface coating composition of claim 1, wherein said functional groups are epoxy.

5. The surface coating composition of claim 1, further comprising a hydrolytic condensation product of the silane compound represented by the formula (I).

6. The surface coating composition of claim 1, further comprising a co-hydrolytic condensation product of the silane compound represented by the formula (I) with the organometallic compound represented by the formula (II).

7. The surface coating composition of claim 1, further comprising a hydrolytic condensation product of the organometallic compound represented by the formula (II).

8. A gas barrier film having a high resistance of oxygen permeability obtained by hydrolytic condensation of the surface coating composition of claim 1.

9. A heat sticking preventing film obtained by hydrolytic condensation of the surface coating composition of claim 1.

10. A gas barrier surface coated resin article having a high resistance of oxygen permeability comprising a resin molded article having at least one side thereof coated with the surface coating composition of claim 1.

11. A surface coated resin article for preventing heat sticking in heat-sensitive heat transfer comprising a resin molded article having at least one side thereof coated with the surface coating composition of claim 1.

12. A method of coating resin article to provide a gas barrier, comprising coating said resin article with the surface coating composition of claim 1.

13. A method of preventing heat sticking to a resin article during heat-sensitive heat transfer, comprising coating the resin article with the surface coating composition of claim 1.

* * * * *